Jan. 6, 1931.   R. SEDLATSCHEK ET AL   1,787,555
SHUTTLE
Filed March 9, 1929
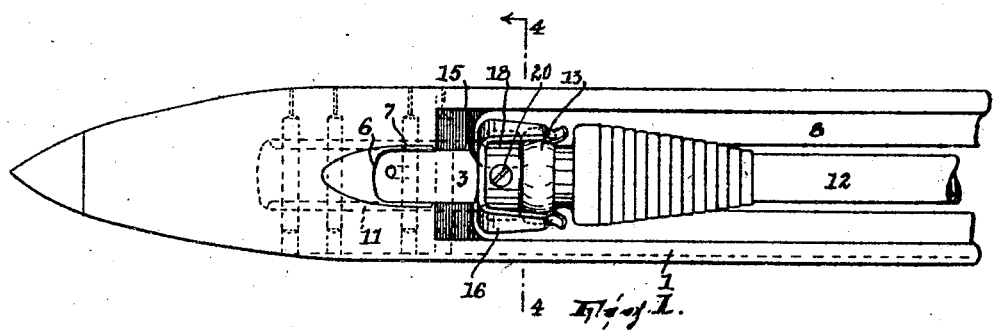
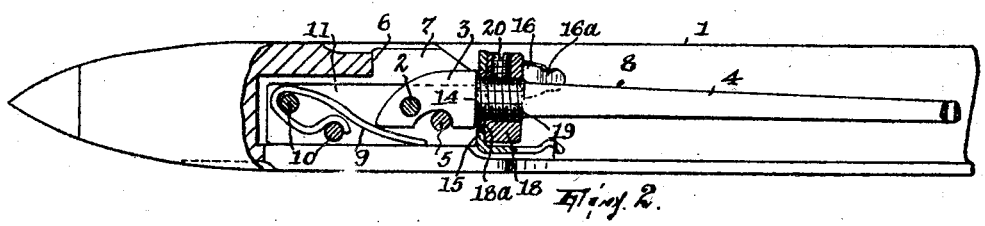
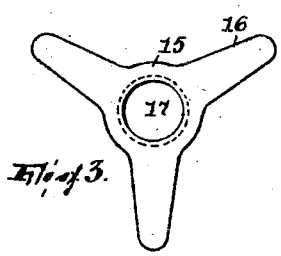
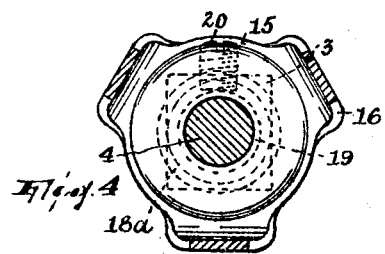
WITNESS:
Wm L Bell
INVENTORS,
Richard Sedlatschek
and Frank Sedlatschek,
John Kinard
ATTORNEY.

Patented Jan. 6, 1931

1,787,555

UNITED STATES PATENT OFFICE

RICHARD SEDLATSCHEK AND FRANK SEDLATSCHEK, OF PATERSON, NEW JERSEY, ASSIGNORS TO UNITED REED & HARNESS COMPANY, A FIRM COMPOSED OF RICHARD SEDLATSCHEK AND FRANK SEDLATSCHEK, OF PATERSON, NEW JERSEY

SHUTTLES

Application filed March 9, 1929. Serial No. 345,634.

In loom shuttles in which the spindles are pivoted so as to be movable up and down it is usual to employ plates between which the butt of the spindle extends and which have their inner ends bent inward to form hooks to engage a head on the butt of the quill to prevent the latter when the spindle is depressed from slipping lengthwise on the spindle in the working of the shuttle in the loom. These hooks or claws become broken off or bent as the result of careless handling in depressing the spindle with the quill thereon, necessitating disassembling of the shuttle parts to repair or replace them. The present invention aims to avoid this trouble by omitting the hooks or claws on the plates (which themselves may be retained as wearplates for the spindle butt) and providing on the spindle itself means to prevent the quill from slipping on the spindle in the way stated. This means comprises one or more spring hooks or claws and it is removable from the spindle so as to be replaced or repaired if a hook or claw becomes bent or broken, though the likelihood of any injury thereto is much less than in the case of the plates mentioned because the engagement therewith and disengagement of the quill therefrom can never take place in a way calculated to impose an undue strain on them. In the best form this means is a piece of spring sheet metal formed in the blank as an apertured disk with radial arms and in its ultimate form having said arms bent off lengthwise of the axis of the disk and provided with inward camming abutments to engage the quill head. For removably securing the disk on the spindle the latter is provided with a shoulder near its butt and the disk being slipped over the spindle and made to abut the shoulder a keeper collar is next fitted over the spindle and, received within the arms of and against the disk, is removably secured to the spindle, as by screwing it thereon, a set screw or both of these means. The result is to provide, without great cost initially or when repairing or replacement is necessary, an efficient means for retaining the quill in fixed position on the spindle.

In the drawing,

Fig. 1 is a fragmentary plan of a shuttle embodying the invention;

Fig. 2 is a side elevation, partly in longitudinal section, of what is shown in Fig. 1;

Fig. 3 is a plan of a certain blank; and

Fig. 4 is a section of the device, enlarged, on line 4—4, Fig. 1.

In the shuttle body 1 on a pin 2 is pivoted the butt 3 of the spindle 4, whose range of pivotal movement is limited as usual by a pin 5 and a shoulder formed at 6 at the end of the extension 7 of the quill cavity 8, 9 being the usual spindle spring engaging the spindle butt and operatively supported by two pins 10. Flanking the spindle butt are the usual plates 11 which here serve as wearplates for the butt and in the present case are without the usual hooks for engaging the head of the quill. 12 is the quill and 13 its said head. The spindle butt affords a shoulder or abutment at 14.

Referring now to our improved means in the specific form thereof herein shown by way of example: A disk 15 has spring arms 16 extending lengthwise of its axis and each formed with an inward cam-like abutment 16a, making it in effect a hook. This may be formed from a blank of spring sheet metal provided with radial arms which are afterwards bent off to extend as stated to form the arms 16. This disk has a central aperture 17 adapting it to be fitted over the spindle and abut the shoulder 14. It may be held on the spindle in any way, but a simple, inexpensive and effective way is to employ a collar 18 which outwardly abuts the disk. This collar may be screwed onto the spindle at 19 or secured thereto by a set screw 20, or both of these expedients employed, as shown. It may further be secured permanently to the disk as by providing it with a reduced extension receiving the aperture of the disk (suitably enlarged for the purpose) and upsetting or riveting the end of such extension as at 18a.

The interlock between the quill and spindle is obviously effected by forcing the former onto the spindle so that its head 13 spreads the arms and until their abutments engage its forward side which forms a forwardly projecting shoulder; the interlock may be disestablished by exerting sufficient force in moving the quill toward the end of the spindle to spread again the said arms. The abutments on the arms are rounded so that the head 13 will cam them apart on movement in either direction; thus a frictional interlock is formed which, while powerful enough to prevent unintended slippage of the quill on the spindle, can be overcome by manual force.

An important feature of our invention, regardless of the presence of means for holding the quill against slippage on the spindle, is that the latter is reinforced at the point where it is weakest, and where it frequently bends and sometimes breaks off as an incident of raising, or lowering it—to-wit, near the butt. This reinforcement is the result of rigidly securing on the spindle a thick annular member so that the same abuts the shoulder at 14, such member in the present example being afforded by the collar and disk and being preferably screwed on the spindle and jammed as the result of the screwing action against said shoulder.

Having thus fully described our invention, what we claim is:

1. In combination, with a shuttle spindle having an abutment near its butt, a disk penetrated by the spindle and abutting the abutment and having a spring arm extending toward the free end of the spindle and adapted to engage exteriorly of a package core arranged on the spindle and hold the same against slippage lengthwise thereof, and a collar secured on the spindle and holding the disk against said abutment.

2. In combination, with a shuttle spindle having an abutment near its butt, a disk penetrated by the spindle and abutting the abutment and having a spring arm extending toward the free end of the spindle and adapted to engage exteriorly of the package core arranged on the spindle and hold the same against slippage lengthwise thereof, and a collar screwed on the spindle and holding the disk against said abutment.

3. In combination, with a shuttle spindle, a disk penetrated by the spindle and having a spring arm extending toward the free end of the spindle and adapted to engage exteriorly of a package core arranged on the spindle and hold the same against slippage lengthwise thereof, and a collar secured on the spindle and having a reduced portion penetrating and riveted to the disk.

4. In combination, a shuttle spindle having an enlarged butt forming a forwardly facing shoulder and a thick annular member screwed on the spindle and jammed against said shoulder.

5. In combination, a shuttle spindle having an enlarged butt forming a forwardly facing shoulder, and a thick annular member secured on the spindle and abutting the shoulder, and having a forwardly projecting spring arm adapted to bear frictionally against a peripheral surface of the core.

In testimony whereof we affix our signatures.

RICHARD SEDLATSCHEK.
FRANK SEDLATSCHEK.